Patented Jan. 28, 1947

2,414,930

UNITED STATES PATENT OFFICE 2,414,930

WASTE LIQUOR DISPOSAL

Benjamin W. Collins, Swarthmore, and Edmond T. Roetman, Ridley Park, Pa., assignors to American Viscose Corporation, Wilmington, Del., a corporation of Delaware No Drawing. Application February 19, 1943, Serial No. 476,504

4 Claims. (Cl. 210—2)

This invention relates to improvements in methods of preparing waste liquors for disposal. More particularly, the invention relates to improvements in methods of preparing for disposal waste liquors which result from the manufacture of viscose rayon and which contain sulfides.

In the manufacture of rayon by the viscose process, a cellulose xanthate solution is extruded into an acid bath wherein the cellulose in the solution is regenerated and free sulfur and sulfur compounds are formed. The cellulose product containing free sulfur is then treated with an alkaline sulfide such as ammonium sulfide or an alkali metal sulfide preferably sodium sulfide which forms with the sulfur readily removable polysulfide compounds. The waste liquors from this process containing the polysulfides presents a difficult disposal problem. The polysulfides as such have a biochemical oxygen demand (B. O. D.) and if discharged directly into a river or stream will deplete the supply of dissolved oxygen in the water, thereby endangering the biological life (fish, crustacea, etc.) in the stream. Also it will lower the capacity of the river or stream to dispose of other polluting substances.

A principal object of the present invention is to provide a method of preparing for disposal waste liquors containing sulfides wherein the sulfides are converted into more highly oxidized compounds which may be discharged into a river or stream without endangering the biological life therein or decreasing the capacity of the river or stream to dispose of other forms of oxidizable matter.

A further object of the invention is to provide a method of preparing for disposal waste liquor containing sulfides wherein the sulfides are subjected to the action of micro organisms and are converted into more highly oxidized compounds.

Other objects and advantages of the invention will be apparent from the following description and appended claims.

In the manufacture of rayon by the viscose process, the rayon containing sulfur is treated with an alkali metal sulfide such as sodium sulfide, portions of which react with the sulfur in the rayon to form sodium polysulfides of varying chemical composition such as $Na_2S_2$, $Na_2S_3$, $Na_2S_4$, or $Na_2S_5$. The rayon is drained and washed and the preparation of the waste liquor from this stage of the process forms the subject matter of the present invention. In accordance with the present invention the hydrogen ion concentration (pH) of the waste liquor is carefully controlled. The waste liquor, being substantially alkaline, is first treated with an acid such as waste sulfuric acid to reduce the pH of the waste liquor to approximately within the range of 8 to 10, preferably approximately 8. The waste liquor is then collected in a storage tank and is withdrawn from the tank and sprayed or otherwise deposited onto a filter bed. The filter bed contains aerobic and/or anaerobic micro organisms which cause the sulfide in the waste liquor to be oxidized to stable sulfur compounds, chiefly sulfates. The filter bed is made of crushed rock having sufficient spaces or interstices to permit the waste liquor to slowly trickle or percolate through the bed and at the same time to present extended surfaces on which the micro organisms may grow in contact with the waste liquor and atmospheric oxygen. Sludge such as activated or digested sludge from a domestic sewage disposal system is deposited on the filter bed and serves to supply the micro organisms used in carrying out the process. A portion of the effluent that has trickled through the filter bed may be introduced into the waste liquor collected in the storage tank to seed the waste liquor with micro organisms to act on the sulfides and assist the action of the micro organisms in the filter bed. Also, the micro organisms added to the waste liquor in the storage tank serve to replenish the micro organisms in the filter bed which, in effect, increases its operating capacity as well as the length of time that the filter bed can be continued in operation.

In the operation of the process the waste liquor containing the sulfide is maintained in contact with the micro organisms until substantially all of the sulfides are oxidized to sulfates, which are final oxidation products and are therefore stable, and the pH of the waste liquor is reduced to within the range of approximately 5 to 7, preferably approximately 7. By applying this procedure the treated waste liquor may be discharged into a river or stream without affecting its biochemical oxygen demand, endangering the animal life therein, or lowering its capacity to dispose of other forms of domestic or industrial pollution.

While a preferred procedure has been described, it is to be understood that changes and variations may be made without departing from the spirit and scope of the invention as defined in the appended claims.

We claim:

1. A method of treating of waste liquor from the manufacture of viscose rayon containing sulfides and polysulfides comprising adding acid to the waste liquor to reduce the pH of the waste liquor to approximately within the range of 8 to 10, and then subjecting the waste liquor to the action of micro organisms which occur in sludge thereby oxidizing by their action the sulfides and polysulfides to stable sulfur compounds.

2. A method of treating of waste liquor from the manufacture of viscose rayon containing sulfides comprising adding an acid to the waste liquor to reduce the pH of the waste liquor to approximately within the range of 8 to 10 and then passing the waste liquor through a filter bed containing micro organisms which occur in sludge thereby oxidizing by their action the sulfides to stable sulfur compounds and adding a portion of the effluent from the filter bed to the raw waste liquor before the waste liquor is passed through the filter bed.

3. A method of treating waste liquor from the manufacture of viscose rayon and containing sulfides, comprising adding sulfuric acid to the waste liquor to reduce the pH of the liquor to approximately within the range of 8 to 10, passing the waste liquor through a filter bed containing micro-organisms which occur in sludge thereby oxidizing the sulfides to stable sulfur compounds by the action of the micro-organisms.

4. A method of treating waste liquor from the manufacture of viscose rayon and containing sulfides, comprising adding sulfuric acid to the waste liquor to reduce the pH of the liquor to approximately within the range of 8 to 10, passing the waste liquor through a filter bed containing micro-organisms which occur in sludge thereby oxidizing the sulfides to stable sulfur compounds by the action of the micro-organisms, and adding a portion of the effluent from the filter bed to the raw waste liquor before the waste liquor is passed through the filter bed.

BENJAMIN W. COLLINS.
EDMOND T. ROETMAN.